(12) United States Patent
Eisenberger

(10) Patent No.: US 8,056,433 B2
(45) Date of Patent: Nov. 15, 2011

(54) SHIFTING DEVICE FOR A MANUAL TRANSMISSION OF A VEHICLE

(75) Inventor: Dieter Eisenberger, Deggenhausertal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 302 days.

(21) Appl. No.: 12/518,303

(22) PCT Filed: Dec. 3, 2007

(86) PCT No.: PCT/EP2007/063116
§ 371 (c)(1),
(2), (4) Date: Jun. 9, 2009

(87) PCT Pub. No.: WO2008/071569
PCT Pub. Date: Jun. 19, 2008

(65) Prior Publication Data
US 2010/0011898 A1    Jan. 21, 2010

(30) Foreign Application Priority Data
Dec. 13, 2006   (DE) .......................... 10 2006 058 914

(51) Int. Cl.
*B60K 20/00* (2006.01)
(52) U.S. Cl. ................................... 74/473.25
(58) Field of Classification Search ........... 74/473.24, 74/473.25, 473.26
See application file for complete search history.

(56) References Cited

U.S. PATENT DOCUMENTS

| 4,377,951 A | | 3/1983 | Magg et al. |
| 4,550,627 A | * | 11/1985 | Lauer et al. ................ 74/473.25 |
| 4,567,785 A | * | 2/1986 | Reynolds et al. .......... 74/473.24 |
| 5,060,538 A | | 10/1991 | Schnell et al. |
| 5,272,931 A | * | 12/1993 | Daniel ......................... 74/473.1 |
| 5,471,893 A | * | 12/1995 | Newbigging .................. 74/335 |

FOREIGN PATENT DOCUMENTS

| AT | 333 602 | 12/1976 |
| DE | 37 04 928 A1 | 8/1988 |
| DE | 39 13 269 A1 | 10/1990 |
| DE | 100 31 754 A1 | 1/2001 |
| DE | 199 60 194 A1 | 6/2001 |
| DE | 101 42 189 A1 | 3/2003 |
| DE | 102 51 351 A1 | 5/2004 |
| GB | 2 066 909 A | 7/1981 |

* cited by examiner

*Primary Examiner* — Vicky Johnson
(74) *Attorney, Agent, or Firm* — Davis & Bujold, P.L.L.C.

(57) ABSTRACT

A shifting device for a multi-gear manual transmission, in particular a gearwheel variable-speed transmission of a vehicle, with a gearshift shaft that can be axially and rotationally moved. A shift gate can be selected by axial movement of the shaft and a gear in the shift gate is engaged by rotation movement of the shaft. A locking device communicates with the gearshift shaft and increases a selection force when selecting a shift gate having a reverse gear. A spring arrangement includes a first spring element, which acts during the selection of a shift gate with two forward gears, and the second spring element acts, together with the locking device, during the selection of the shift gate with the reverse gear.

16 Claims, 4 Drawing Sheets

SHIFTING DEVICE FOR A MANUAL TRANSMISSION OF A VEHICLE

This application is a National Stage completion of PCT/EP2007/063116 filed Dec. 3, 2007, which claims priority from German patent application Ser. No. 10 2006 058 914.9 filed Dec. 13, 2006.

FIELD OF THE INVENTION

The invention concerns a shifting device for a multi-gear manual transmission of a vehicle.

BACKGROUND OF THE INVENTION

In manual shift transmissions with a central gearshift lever shaft various components in the transmission are involved in producing selection and shifting forces. In particular, these components serve to assist the driver of the vehicle to move the gearshift lever in the shift gates in accordance with the gearshift diagram and at the same time, by virtue of this support, to avoid any damage to transmission components. The vehicle's driver should be able to sense which shift gate he is currently in with the gearshift lever. In this, particular attention should be paid to the transition into shift gates in which particularly low transmission ratios are engaged or in which the ratio for the reverse gear is engaged. If too low a transmission ratio or the reverse gear were to be engaged without the conditions of the vehicle being appropriate for this, especially because the speed is too low or a driving direction reversal is initiated without the vehicle first having come to rest, then the shifting devices and in particular the synchronization devices could be damaged. Also, by virtue of their structure frictional losses occur during the interaction of individual components, which in unfavorable cases can lead to a reduction of driving comfort.

To avoid undesired shift processes it must be possible to prevent the mechanical shift process by impeding the movement of the gearshift lever or at least making it more difficult. For example, a shift into a reverse gear should not be allowed if the vehicle is moving in the forward direction at more than an acceptable speed. To ensure this, barriers or stops are provided in the shifting device, which cannot be overcome or only so with substantial difficulty if the driver of the vehicle tries to move to the shift position in the gearshift diagram of the vehicle which contains the reverse gear.

From automotive technology gearshift actuating devices for selecting a shift gate and engaging a gear step in a transmission, in particular a manual change-speed transmission, are well enough known. To select a desired shift gate the driver can actuate a gearshift lever which can be coupled to a gearshift shaft by a gearshift linkage. By moving the gearshift shaft longitudinally the desired shift gate can be selected and by corresponding rotational movement of the gearshift shaft a gear can be engaged in the shift gate selected. In addition a shifting link is provided, which suitably translates the longitudinal and rotational movements of the gearshift shaft and guides the gearshift rails and shift operating means so as to engage a desired gear.

A shift locking device known from automotive technology comprises a spring-loaded locking pin with securing means. With this solution it can happen that when shifting into reverse, the shift gate containing the reverse gear is selected erroneously and an attempt is made to engage it, with resulting clashing noises from the clutch teeth. For example particularly hard locking means can be used to secure against slipping out of the reverse gear, but this makes it more difficult to engage the reverse gear even when this shift is desired.

DE 199 60 194 A1 discloses a device for producing restoring forces or higher selection forces on a gearshift shaft. The device comprises a guiding element, a pre-stress element, a stop, an abutment plate and at least three spring elements. By means of the spring elements different selection forces or different restoring forces can be produced for different selector positions. However, such a device correspondingly increases the structural fitting space needed in the axial direction of the gearshift shaft. Furthermore the device consists of numerous individual parts some of which are quite expensive and complicated to produce, since for example the guiding element must have corresponding guide-tracks.

From DE 102 51 351 A1 a shifting device is known, which comprises a gearshift shaft, a stop abutment for movement of the gearshift shaft in a shift gate with a reverse gear step, and an indicator device for the reverse gear position of the gearshift shaft. A locking element is provided, which enables both the stop and the actuation of the indicator device. The locking element comprises a tappet-rod and a spring element that acts on the tappet-rod. The locking device is arranged so that the tappet-rod engages in a recess of the gearshift shaft. The tappet-rod and the recess of the gearshift shaft have inclined faces that correspond with one another. When the inclined face of the gearshift shaft comes in contact with the inclined face of the tappet-rod, the stop for movement of the gearshift shaft in the shift gate with the reverse gear is produced.

For selecting the shift gate with the reverse gear two types of shift operation are distinguished, namely static and dynamic selection.

In static selection of the shift gate with the reverse gear, the inclined face of the gearshift shaft recess is already in contact with the inclined face of the tappet-rod before the shift gate with the reverse gear is selected. By means of the gearshift lever the driver of the vehicle exerts a force on the gearshift shaft, whereby the static friction between the tappet-rod and the gearshift shaft is overcome and the gearshift shaft moves in the direction of the shift gate with the reverse gear. During this the tappet-rod is pushed against the spring element of the locking device. Thus, in static selection of the shift gate with the reverse gear large friction forces (static friction) are active and a large selection force is therefore needed.

In dynamic selection of the shift gate with the reverse gear the inclined face of the gearshift shaft recess is not yet in contact with the inclined face of the tappet-rod before the shift gate with the reverse gear has been selected. By means of the gearshift lever the driver of the vehicle exerts a force on the gearshift shaft, moving it in the direction of the shift gate with the reverse gear. During this, the inclined face of the gearshift shaft recess encounters the inclined face of the tappet-rod while in motion, and the tappet-rod is pushed against the spring element of the locking device. But when the inclined faces of the gearshift shaft recess and the tappet-rod come in contact while in motion, the force required to overcome the stop effect is much smaller because the sliding friction between the gearshift shaft and the tappet-rod is substantially less than the static friction during static selection of the shift gate with the reverse gear. Thus, dynamic selection of the shift gate with the reverse gear requires a much smaller selection force than static selection of the shift gate with the reverse gear.

A disadvantage of such a device is that the difference between the selection forces needed for static and for dynamic selection of the shift gate with the reverse gear is fairly large, and this has an adverse effect on selection comfort.

SUMMARY OF THE INVENTION

The purpose of the present invention is to indicate a shifting device for a manual transmission, with which the disadvantages of the prior art are eliminated or reduced. With the shifting device selecting a shift gate with a reverse gear should be clearly perceptible by the driver of the vehicle but the difference between the selection forces required for static and dynamic selection of the shift gate with the reverse gear should be substantially reduced.

The shifting device according to the invention for a multi-gear manual transmission, in particular a manually actuated gearwheel variable-speed transmission of a motor vehicle, comprises a gearshift shaft arranged in a housing, for example a gearshift or transmission housing, so that it can be axially displaced and also rotated. A shift gate can be selected by axial longitudinal movement of the gearshift shaft, and once in the shift gate selected, a gear can be engaged by rotation movement of the gearshift shaft. In addition, the shifting device comprises a locking device for increasing the selection force when selecting a shift gate with a reverse gear, and a spring arrangement. The locking device comprises a tappet-rod, a spring element and a threaded cap, and is arranged in the housing in such manner that the tappet-rod engages in a recess of the gearshift shaft. The tappet-rod is arranged in the housing so that it can move radially relative to the gearshift shaft, and is pressed by the spring element against an abutment surface in the housing. On its tip that engages in the gearshift shaft recess the tappet-rod has inclined surfaces. Likewise, the gearshift shaft recess has inclined surfaces that correspond with those of the tappet-rod. When the inclined surface of the gearshift shaft recess comes into contact with that of the tappet-rod, a stop is created for the movement of the gearshift shaft into the shift gate with the reverse gear, which can only be overcome by increasing the force. The spring arrangement comprises at least a first spring element, a second spring element and a stop, which can be made for example as a sleeve. The first spring element, the second spring element and the sleeve are arranged concentrically on the gearshift shaft and can be correspondingly supported in the axial direction by abutment elements. The first spring element has a small spring constant, whereas the second spring element has a large spring constant. The resistance force of the spring arrangement is fairly constant and can be determined very accurately by virtue of the spring constants.

In the unactuated condition of the gearshift lever the first spring element acts with a small force upon the gearshift shaft, in such manner that the gearshift shaft or gearshift lever is positioned in a starting location. From this initial location, to select a shift gate having two forward gears the driver of the vehicle must move the gearshift lever and therefore also the gearshift shaft against the spring force of the first spring element and in opposition to a certain amount of friction force in the shifting device. Thus, when selecting a shift gate with two forward gears it is essentially the first spring element of the spring arrangement that acts upon the gearshift shaft, so that selecting a shift gate with two forward gears is correspondingly easy.

Only when selecting the shift gate with the reverse gear does the second spring element of the spring arrangement co-operate with the locking device. Thus, when selecting the shift gate with the reverse gear, in essence the stop formed by the locking device and the gearshift shaft recess, and the spring force of the second spring element of the spring arrangement, need correspondingly larger force to overcome them.

When the shift gate with the reverse gear has been reached, rotation of the gearshift shaft can engage either the reverse gear or a crawler gear, and for this among other things the second spring element is compressed and the tip of the tappet-rod of the locking device slides over the surface of the gearshift shaft. Due to the friction between the tappet-rod and the gearshift shaft surface, among other things the restoring force of the second spring element is inhibited when deselecting the shift gate with the reverse gear, since the friction force opposes the restoring force of the spring element. The restoring force on emerging from the shift gate with the reverse gear is thus somewhat reduced and on deselecting the reverse-gear shift gate the selection behavior is better from the standpoint of the vehicle's driver.

Thanks to the shifting device according to the invention the selection comfort is substantially improved because the difference in the selection force needed for static and for dynamic selection of the shift gate with the reverse gear is substantially reduced, while an easy shift process is ensured when selecting a shift gate with two forward gears. It is clearly signalled to the driver of the vehicle that he is in the process of selecting the shift gate with the reverse gear.

BRIEF DESCRIPTION OF THE DRAWINGS

Below, the basic principle of the invention is explained in more detail with reference to the drawings, which show.

DETAILED DESCRIPTION OF THE PREFERRED EMBODIMENTS

Figure 1:
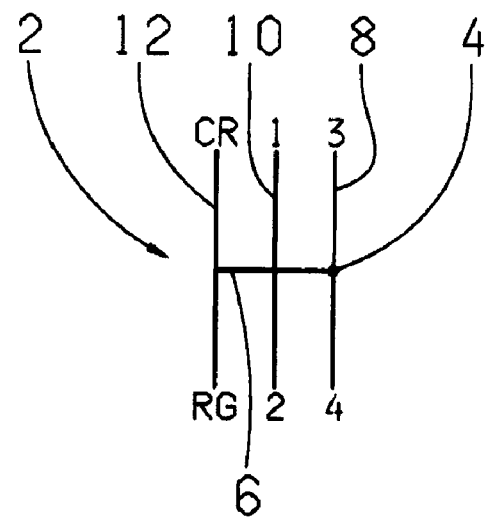
FIG. 1: Typical gearshift diagram for a manually actuated gearwheel variable-speed transmission with three shift gates.

FIG. 1 shows a typical gearshift diagram for a variable-speed transmission with manually actuated gearwheel and three shift gates. The gearshift lever of the transmission is usually in its rest position, namely position 4 in shift gate 8, in which the gearshift lever positions for the third and fourth gears are reached. In shift gate 10 are arranged the positions of the gearshift lever for the first and second gears, and in shift gate 12 is the position of the gearshift lever for the reverse gear and sometimes also for a crawler gear. To change from the rest position 4 in shift gate 8 to one of the other shift gates 10 or 12, the driver of the vehicle must move the gearshift lever into the transverse gate 6, toward the left. This process is called selecting, whereas the movement within one of the shift gates 8, 10, 12 into one or other of the two respective gearshift lever positions is called engaging. If, from shift gate 8, the vehicle's driver selects another shift gate 10 or 12, he must move the gearshift lever in the transverse gate 6 against some resistance so that he recognises that he is leaving shift gate 8. Movement into shift gate 10 can be carried out against a relatively small resistance, whereas movement into shift gate 12 is opposed by a larger resistance.

Figure 2:
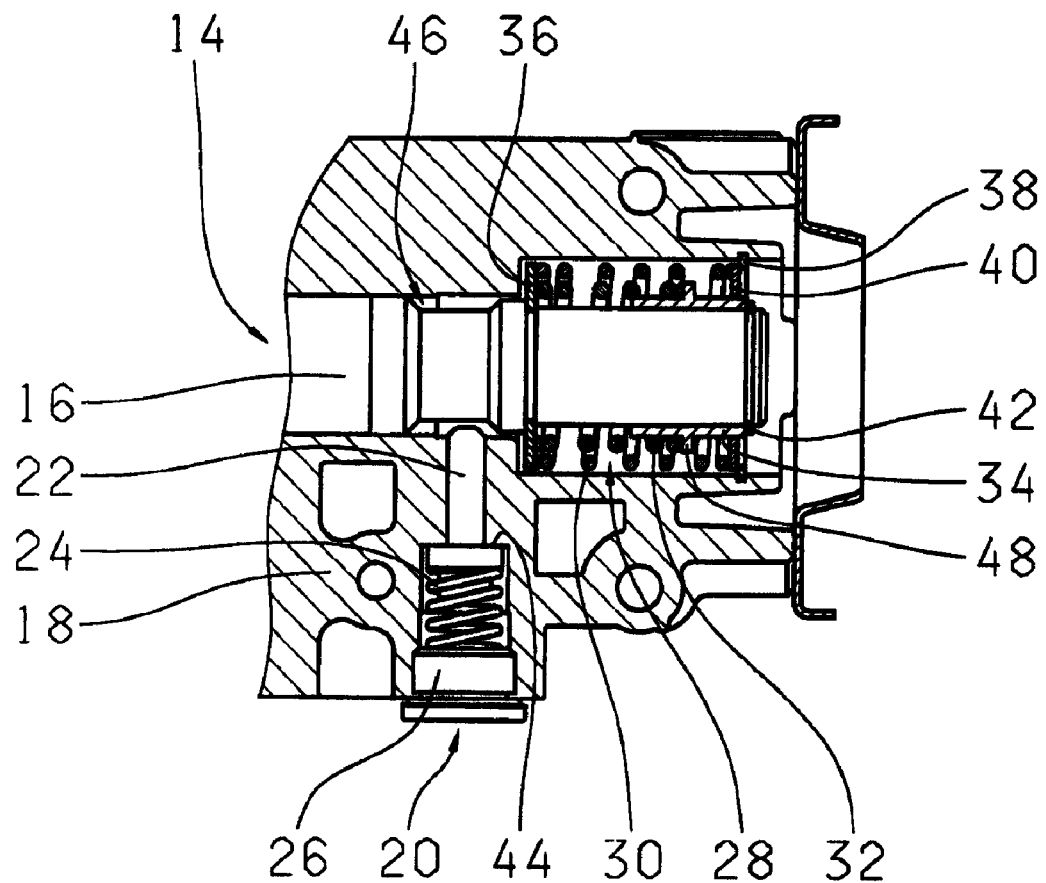
FIG. 2: The shifting device according to the invention for a transmission with three shift gates, in its initial position.

FIG. 2 shows the shifting device 14 according to the invention for a transmission (not described here) with three shift gates. The shifting device 14 is arranged in a housing 18, for example a gearshift or transmission housing, and comprises a gearshift shaft 16, a locking device 20 and a spring arrangement 28. The gearshift shaft 16 is arranged in the housing so that it can be moved axially and also rotated, in such manner that by its axial longitudinal movement a shift gate can be selected and by its rotation movement within the shift gate a gear can be engaged. The locking device 20 comprises a tappet-rod 22, a spring element and a screw cap 26. The locking device 20 is arranged in the housing 18 in such manner that the tappet-rod 22 engages a recess 46 of the gearshift shaft 16. The tappet-rod 22 and the recess 46 of the gearshift shaft 16 have inclined faces which correspond with one another. The spring arrangement comprises a first spring element 30, a second spring element 32 and a stop element 34 in this case made as a sleeve. The first spring element 30, the second spring element 32 and the sleeve 34 are arranged concentrically on the gearshift shaft 16 and are supported in the axial direction by stop elements 36, 38, 40, 42. In FIG. 2 the shifting device 14 according to the invention is shown in its initial position, i.e. in the shift gate with the third and fourth gears. In this case the first spring element 30 pushes the gearshift shaft 16 with a small force toward the left in the plane of the drawing, against a stop (not shown here). The sleeve 34 is arranged on the gearshift shaft 16 so that it can move axially, and has a stop 48, which can for example be made integrally with the sleeve or can be formed by an abutment plate or a retaining ring. By means of the second spring element 32 and the retaining ring 42 the sleeve 34 is correspondingly strongly pre-stressed on the gearshift shaft 16. With its small diameter the sleeve 34 slips through the stop element 40 and is therefore inactive in this shift gate. The tappet-rod 22 is arranged in the housing 18 so that it can move radially relative to the gearshift shaft 16 and is pushed by the spring element 24 against a contact surface 44 in the housing 18. During this it is not in contact with the gearshift shaft 16.

Figure 3:
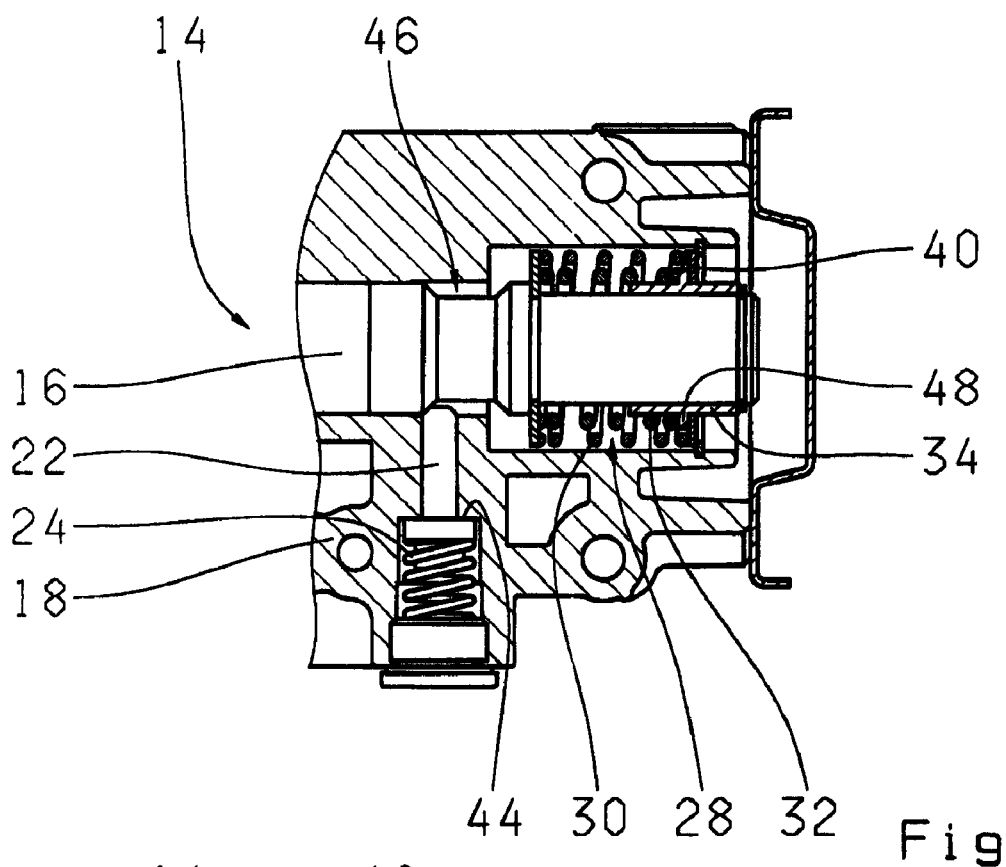
FIG. 3: The shifting device according to the invention for a transmission with three shift gates, in shift gate ½.

FIG. 3 shows the shifting device 14 according to the invention in the shift gate with the first and second gears. Starting from FIG. 2, the gearshift shaft 16 is moved to the right in the plane of the drawing until the shift gate with the first and second gears has been reached. For this, it has to be pressed with a small force against the first spring element 30. In this position the inclined face of the tappet-rod 22 is in contact with the inclined face of the recess 46 of the gearshift shaft 16. Thanks to the force of the spring element 24 the tappet-rod 22 of the locking device 20 acts in combination with the gearshift shaft 16 as a stop. The tappet-rod 22 is till in contact with the contact surface 44 on the housing 18. With its stop 48, the sleeve 34 is up against the stop element 40. Until now the second spring element 32 of the spring arrangement 28 has not yet come into action.

Figure 4:
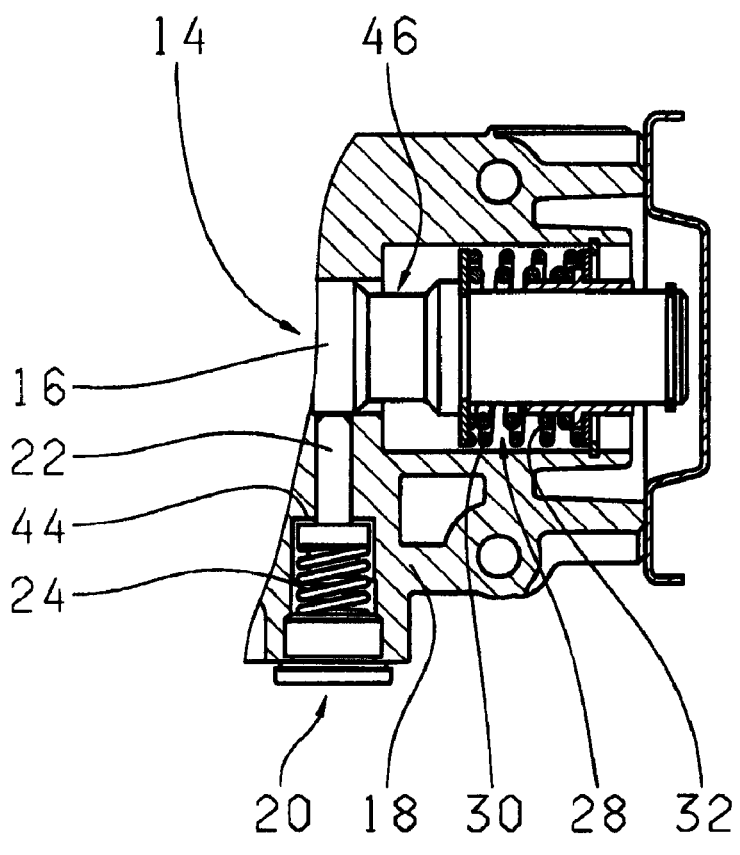
FIG. 4: The shifting device according to the invention for a transmission with three shift gates, in the shift gate with the reverse gear.

In FIG. 4 the shifting device 14 according to the invention is shown in the shift gate with the reverse gear. The selection force when selecting to move from the shift gate with the first and second gears to the shift gate with the reverse gear first increases without any distance being covered, since the force of the second spring element 32 prevails and the spring-loaded tappet-rod 22 has to be lifted over the inclined surface of the recess 46 of the gearshift shaft 16. Due to the mutual contact between the inclined surfaces the axial movement of the gearshift shaft 16 is opposed by a resistance, whereby a barrier is formed against unintended selection of the shift gate with the reverse gear. Only when this obstacle is intentionally overcome and the inclined faces slide along one another can the gearshift lever be pushed in the direction of the shift gate with the reverse gear. Thus, to select the shift gate with the reverse gear, in essence two resistances have to be overcome in order to move the gearshift shaft 16 farther to the right in the plane of the drawing. The tappet-rod 22 is pushed against the spring force of the spring element 24 and thus leaves the contact surface 44 on the housing 18. The two spring elements 30, 32 of the spring arrangement 28 are correspondingly compressed and, together with the locking device 20, bring about an increase of the force for selecting the shift gate with the reverse gear, which is clearly perceptible by a driver of the vehicle. In FIG. 4 the shift gate with the reverse gear has been reached but the reverse gear has not yet been engaged. Up to this point the gearshift shaft 16 has only been displaced axially in the transverse gate. Only when the gearshift shaft 16 is rotated by the gearshift lever is the reverse gear or a crawler gear actually engaged. During this rotation, the tip of the tappet-rod slides on the surface of the gearshift shaft 16.

The above description of the shifting device 14 according to the invention for a transmission with three shift gates can correspondingly also be used for a group transmission, for example with superimposed H-shifting.

Figure 5:
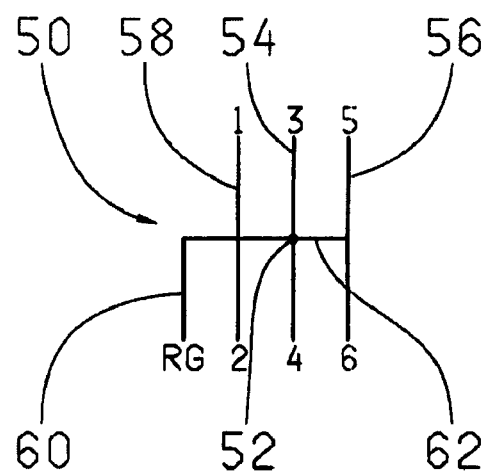
FIG. 5: Typical gearshift diagram for a manually actuated gearwheel variable-speed transmission with four shift gates.

FIG. 5 shows a typical shift diagram 50 for a variable-speed transmission with manually actuated gearwheels, six forward gears and one reverse gear. The gearshift lever of the transmission is usually in its rest position, namely in position 52 in the shift gate 54, in which the gearshift lever positions for the third and fourth gears is reached. The gearshift lever position for the reverse gear is in the shift gate 60. The gearshift lever positions for the first and second gears are in shift gate 58, while the gearshift lever positions for the fifth and sixth gears are reached in the shift gate 56. In order to change from the rest position 52 in shift gate 54 to one of the other shift gates 56, 58, 60 the driver of the vehicle must move the gearshift lever into the transverse gate 62 and to the left or to the right. This process is called selecting, while movement within one of the shift gates 54, 56, 58, 60 to one or other of the two respective gearshift lever positions in the gate is termed engaging. For the vehicle's driver to select another shift gate 56, 58, 60 starting from the shift gate 54, he must move the gearshift lever in the transverse gate 62 against some resistance, which causes him to recognize that he is leaving the shift gate 54. Movement into the shift gates 56 and 58 can be carried out against relatively low resistance, whereas movement into shift gate 60 is opposed by a higher resistance.

Figure 6:
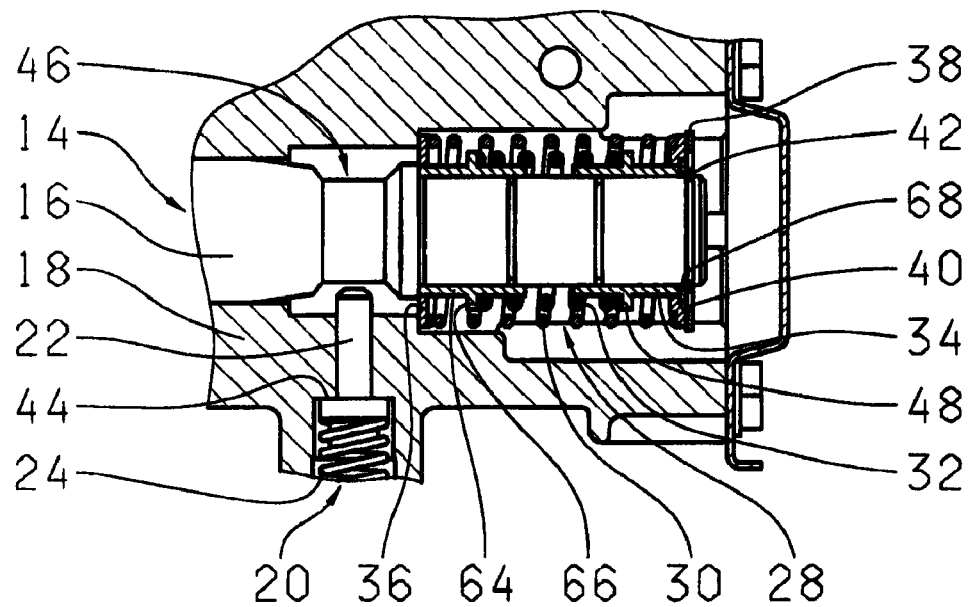
FIG. 6: The shifting device according to the invention for a transmission with four shift gates, in its initial position.

FIG. 6 shows the shifting device 14 according to the invention for a transmission with four shift gates. The mode of operation of the shifting device 14 is essentially the same as that already described for a transmission with three shift gates. In this case too the shifting device 14 comprises a gearshift shaft 16, a locking device 20 and a spring arrangement 28. The locking device 20 and its function are identical to those described for the shifting device 14 for a transmission with three shift gates. The spring arrangement is extended by a second sleeve 64 and a further stop element 68, and thus comprises here at least a first spring element 30, a second spring element 32 and the two stop elements 34 and 64 in this case made as sleeves. The first spring element 30, the second spring element 32 and the sleeves 34, 64 are arranged concentrically on the gearshift shaft 16 and can be supported in the axial direction by stop elements 36, 38, 40, 42, 68. The two sleeves 34, 64 are arranged on the gearshift shaft 16, on which they can move axially. In FIG. 6 the shifting device 14 according to the invention is shown in its initial position, i.e. in the shift gate with the third and fourth gears. Here, the gearshift shaft 16 is held by the first spring element 30 with a small force in such manner that the tappet-rod 22 is in the middle of the recess 46 of the gearshift shaft 16. The sleeves 34, 64 each have respective stops 48, 66 between which the second spring element 32 is arranged. The stops 48, 66 can for example be made integrally with their respective sleeves 34, 64, or formed by a stop plate or a retaining ring. Thus, the second spring element 32 is correspondingly pre-stressed so that the sleeve 64 rests against a stop on the gearshift shaft 16 and the sleeve 34 rests against the stop element 68. With its smaller diameter the sleeve 34 slips through the stop element 40 and with its smaller diameter the sleeve 64 slips through the stop element 36. In this position the second spring element 32 is not active. The tappet-rod 22 is pressed by the spring element 24 against the contact surface 44 in the housing 18, and does not touch the gearshift shaft 16.

If the shift gate with the fifth and sixth gears is to be selected, then the gearshift shaft 16 is moved to the left in the plane of the drawing. For this, a small force is exerted against the first spring element 30, which is noticeable as a small selection force.

To select the shift gate with the first and second gears, the gearshift shaft is moved to the right in the plane of the drawing. For this, once again a small force is exerted against the first spring element 30. In this position the tappet-rod 22 rests with its inclined face against the inclined face of the recess 46 in the gearshift shaft 16. Due to the force of the spring element 24 the tappet-rod 22 acts in combination with the inclined face of the recess 46 in the gearshift shaft 16 to form a stop. The tappet-rod 22 is still in contact with the contact surface 44 on the housing 18 and the sleeve 34 rests with its stop 48 against the stop element 40. In the shift gate with the first and second gears the second spring element 32 is not yet active.

Figure 7:
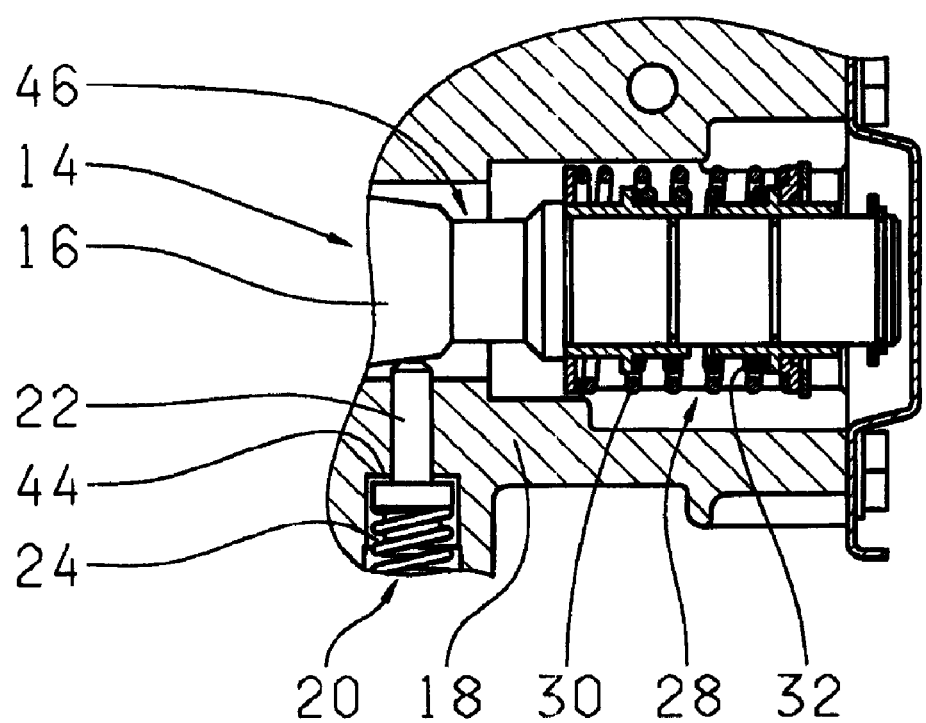
FIG. 7: The shifting device according to the invention for a transmission with four shift gates, in the shift gate with the reverse gear.

FIG. 7 shows the shifting device 14 according to the invention in the shift gate with the reverse gear. The selection force needed for changing from the shift gate with the first and second gears and selecting the shift gate with the reverse gear first increases, without any distance being covered since the force of the second spring element 32 prevails and the spring-loaded tappet-rod 22 has to be lifted over the inclined face of the recess 46 in the gearshift shaft 16. Thus, when selecting the shift gate with the reverse gear in essence two resistances have to be overcome in order to move the gearshift shaft 16 farther to the right in the plane of the drawing. Correspondingly, the tappet-rod 22 is pushed against the spring force of the spring element 24 and therefore moves clear of the contact face 44 on the housing 18. The two spring elements 30, 32 are correspondingly compressed and, together with the locking device 20, act to signal the force increase for selecting the shift gate with the reverse gear.

As described in FIGS. 1 to 7, with the shifting device 14 according to the invention appropriate design of the gearshift shaft 16 in the area of the inclined surfaces of its recess 46 can correspondingly influence the selection force needed for selecting the shift gate with the reverse gear. Other designs are also conceivable, in which for example the stop elements 36, 38, 40, 42, 68 are differently arranged and the sleeves 34, 64 are differently formed. Likewise, the spring characteristics of the spring elements 24, 30, 32 can be adapted appropriately to suit the design form. For example, the spring elements 24, 30, 32 are formed as spiral springs. The stop elements 36, 38, 40, 42, 68 can for example take the form of stop plates or retaining rings.

The shifting device 14 according to the invention signals clearly to the driver of the vehicle that he is in the process of selecting the shift gate with the reverse gear. Thanks to the combined action of the locking device 20 and the second spring element 32 of the spring arrangement 28 the difference between the selection forces needed for static and dynamic selection of the shift gate with the reverse gear can be substantially reduced, which considerably improves the selecting comfort.

Indexes
2 Gearshift diagram
4 Rest position
6 Transverse gate
8 Shift gate
10 Shift gate
12 Shift gate
14 Shifting device
16 Gearshift shaft
18 Housing, gearshift or transmission housing
20 Locking device
22 Tappet-rod
24 Spring element
26 Screw cap
28 Spring arrangement
30 First spring element
32 Second spring element
34 Stop element, sleeve
36 Stop element
38 Stop element
40 Stop element
42 Stop element
44 Contact surface
46 Recess
48 Stop
50 Gearshift diagram
52 Rest position
54 Shift gate
56 Shift gate
58 Shift gate
60 Shift gate
62 Transverse gate
64 Stop element, sleeve
66 Stop
68 Stop element

The invention claimed is:

1. A shifting device (14) for a multi-gear manual transmission of a motor vehicle, the shifting device comprising:
   a gearshift shaft (16) arranged in a housing (18) such that the gearshift shaft (16) is axially and rotationally movable, and by axial longitudinal movement a shift gate is selected, and, by rotational movement within the selected shift gate a gear is engaged,
   a locking device (20) arranged perpendicular to the gearshift shaft (16), for increasing a selection force when selecting a shift gate with a reverse gear,
   a spring arrangement (28) which comprises at least a first spring element (30), a second spring element (32) and a first stop element (34, 68) such that the first spring element (30) acts during selection of a shift gate with two forward gears and the second spring element (32) acts together with the locking device (20) during the selection of the shift gate with the reverse gear such that a force required to shift into the shift gate with the reverse gear is greater than a force required to shift into each shift gate with two forward gears.

2. The shifting device (14) according claim 1, wherein the locking device (20) comprises a tappet-rod (22), a spring element (24) and a screw cap (26).

3. The shifting device (14) according claim 1, wherein the locking device (20) is arranged in the housing such that a tappet-rod (22) engages in a recess (46) of the gearshift shaft (16).

4. The shifting device (14) according claim 3, wherein the tappet-rod depresses farther into the locking device (20) when the gearshift shaft is in the shift gate having the reverse gear than when the gearshift shaft is in any shift gate having two forward gears.

5. The shifting device (14) according claim 3, wherein the tappet-rod (22) has inclined faces, at a tip thereof that engages in the recess (46) of the gearshift shaft (16), which correspond with inclined faces of the recess (46) in the gearshift shaft (16).

6. The shifting device (14) according claim 1, wherein the first spring element (30), the second spring element (32) and the first stop element (34, 68) are arranged concentrically on the gearshift shaft (16) and are supported in the axial direction by second stop elements (36, 38, 40, 42).

7. The shifting device (14) according claim 1, wherein the first stop element (34, 68) is arranged and axially movable on the gearshift shaft (16) and comprises an abutment (48, 66).

8. The shifting device (14) according claim 1, wherein the first stop element (34, 68) is a sleeve.

9. The shifting device (14) according claim 1, wherein the housing (18) is either a gearshift housing or a transmission housing.

10. The shifting device (14) according claim 1, wherein the locking mechanism (20) is releasably engageable with the gearshift shaft, in a perpendicular direction to a movement of the first spring element (30) and the second spring element (32).

11. The shifting device (14) according claim 1, wherein the first spring element (30) acts during both selection of the shift gate having two forward gears and selection of the shift gate having the reverse gear, and the second spring element (32) acts only during selection of the shift gate having the reverse gear.

12. A method for increasing a selection force when selecting a shift gate with a reverse gear of a multi-gear manual transmission, with a gearshift shaft (16) arranged in a housing (18) so that the gearshift shaft (16) is axially and rotationally movable, and with a locking device (20) arranged perpendicular to and realeasably engageable with the gearshift shaft (16), the method comprising the step of:

increasing a selection force when selecting the shift gate with the reverse gear to be greater than a selection force required when selecting any shift gate with two forward gears, by a co-operation between the locking device (20) and a spring element (32) of a spring arrangement (28) so as to tactually indicate selection of the shift gate with the reverse gear to an operator of the transmission.

13. A shifting device (14) for a multi-gear manual transmission of a motor vehicle, the shifting device comprises:

a gearshift shaft (16) supported by a housing (18) such that the gearshift shaft (16) is axially and rotationally movable, and the gearshift shaft (16) being axially biased for selecting one of a plurality of shift gates each having two forward gears and a reverse shift gate (8, 10, 12) at least having a reverse gear and the gearshift shaft (16) being rotatable as a gear in the selected shift gate (8, 10, 12) is engaged, the gearshift shaft (16) having a recess (46);

a locking device (20), arranged perpendicular to the gearshift shaft (16) and, being supported in the housing (18) and comprising a tappet-rod (22), a locking device spring element (24) and a screw cap (26), the tappet-rod (22) engaging the recess (46) of the gearshift shaft (16), as the gearshift shaft (16) axially slides such that a selection force increases as a shift gate with a reverse gear is selected; and a spring arrangement (28) comprises at least a first spring element (30), a second spring element (32) and a first stop element (34, 68), and the first spring element (30) acts during selection of one of the plurality of shift gates having two forward gears and the second spring element (32) acts in combination with the locking device (20) during selection of the reverse shift gate having the reverse gear such that a force required to select the reverse shift gate with the reverse gear is greater than a force required to select each of the plurality of shift gates with two forward gears.

14. The shifting device (14) according claim 13, wherein the first spring element (30), the second spring element (32) and the first stop element (34, 68) are arranged concentrically on the gearshift shaft (16) and are supported in the axial direction by second stop elements (36, 38, 40, 42, 68).

15. The shifting device (14) according claim 13, wherein the plurality of shift gates each having two forward gears comprises a first shift gate with forward gears and a second shift gate with two forward gears.

16. The shifting device (14) according claim 13, wherein the plurality of shift gates each having two forward gears comprises a first shift gate with forward gears, a second shift gate with two forward gears and a third shift gate with two forward gears.

* * * * *